United States Patent [19]

Fries, Jr.

[11] 4,288,003
[45] Sep. 8, 1981

[54] APPARATUS FOR AUTOMATICALLY DISPENSING NON-ROUND FLEXIBLE CONTAINERS

[75] Inventor: Carl Fries, Jr., Holland, Pa.

[73] Assignee: International Paper Company, New York, N.Y.

[21] Appl. No.: 103,043

[22] Filed: Dec. 13, 1979

Related U.S. Application Data

[63] Continuation-in-part of Ser. No. 869,505, Jan. 16, 1978, Pat. No. 4,180,180.

[51] Int. Cl.³ .............................................. B65G 59/10
[52] U.S. Cl. ........................................ 221/1; 221/222
[58] Field of Search ............... 221/221, 222, 223, 297, 221/1, 42; 53/282, 289; 414/129

[56] References Cited

U.S. PATENT DOCUMENTS

| | | | |
|---|---|---|---|
| 1,907,713 | 5/1933 | Benson | 221/36 |
| 1,907,714 | 5/1933 | Benson | 221/36 |
| 2,297,847 | 10/1942 | Wilckens et al. | 214/8.5 |
| 2,692,691 | 10/1954 | Harriss et al. | 214/8.5 |
| 2,721,002 | 10/1955 | Smith | 221/222 |
| 3,074,594 | 1/1963 | Cheeley | 221/93 |
| 3,090,523 | 5/1963 | Packman | 221/36 |
| 3,098,585 | 7/1963 | Giepen | 221/116 |
| 3,122,267 | 2/1964 | Edwards | 221/1 |
| 3,198,382 | 8/1965 | Cleary | 221/222 |
| 3,741,410 | 6/1973 | Henschke et al. | 214/8.5 K |
| 3,840,150 | 10/1974 | Kinney | 221/222 |
| 3,849,970 | 11/1974 | Kinney | 221/222 |
| 3,862,702 | 1/1975 | Johnson et al. | 221/1 |
| 3,903,676 | 9/1975 | Kinney | 53/314 |
| 3,935,967 | 2/1976 | Doucette | 221/222 |
| 3,958,720 | 5/1976 | Anderson | 221/93 |
| 4,044,896 | 8/1977 | Reinecke | 214/8.5 H |

FOREIGN PATENT DOCUMENTS 225606 8/1968 U.S.S.R. .

Primary Examiner—Stanley H. Tollberg
Attorney, Agent, or Firm—Stephen P. Gilbert

[57] ABSTRACT

Apparatus and method for dispensing non-round, flexible, elastic, flanged containers from a nested stack of such containers are disclosed. The sidewalls of the bottommost container are compressed, preferably at the corners, causing the remainder of the stack of containers to move vertically upward, and a separator is inserted into the gap created between the flange of the bottommost container and the flange of the penultimate container. The bottommost container is then dispensed from the remaining containers. In the preferred embodiment, a rotor assembly is used. It comprises a separator blade, a wiper blade, and a top support disc, which are concentrically, fixedly mounted on the shaft of the assembly. The assembly further comprises a squeezer wheel, which provides the required tray compression and is rotatably and eccentrically mounted with respect to the rest of the assembly.

10 Claims, 24 Drawing Figures

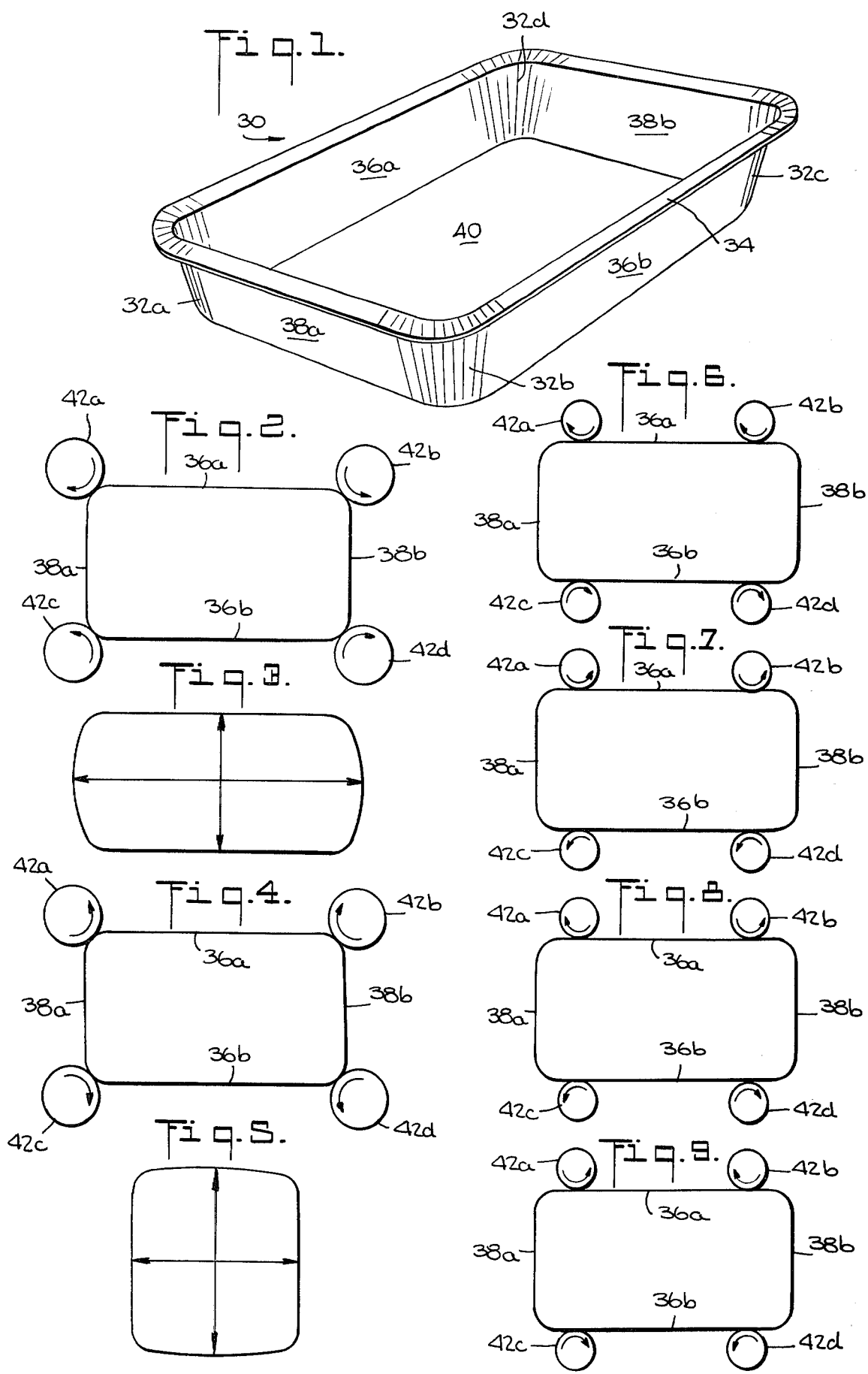

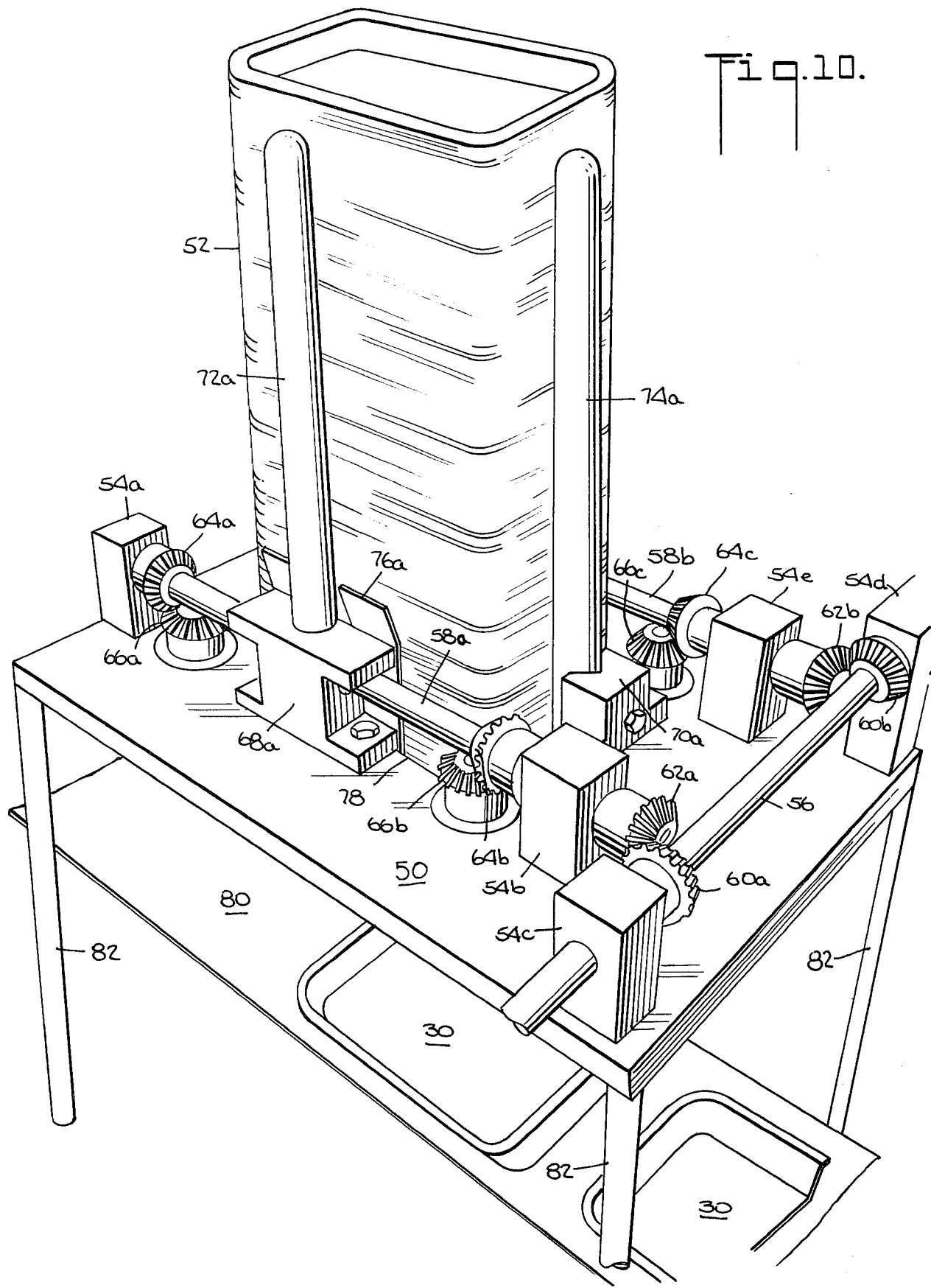

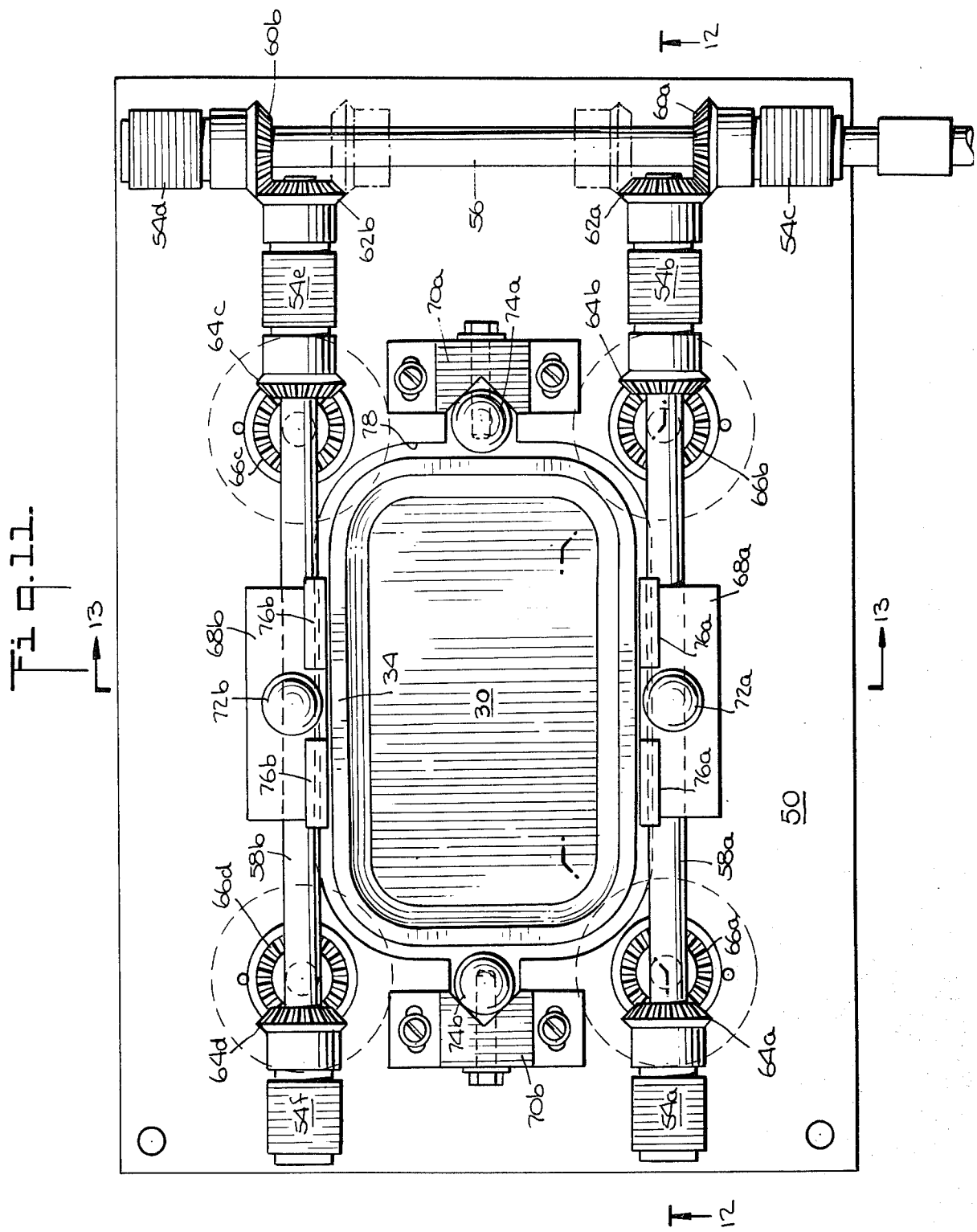

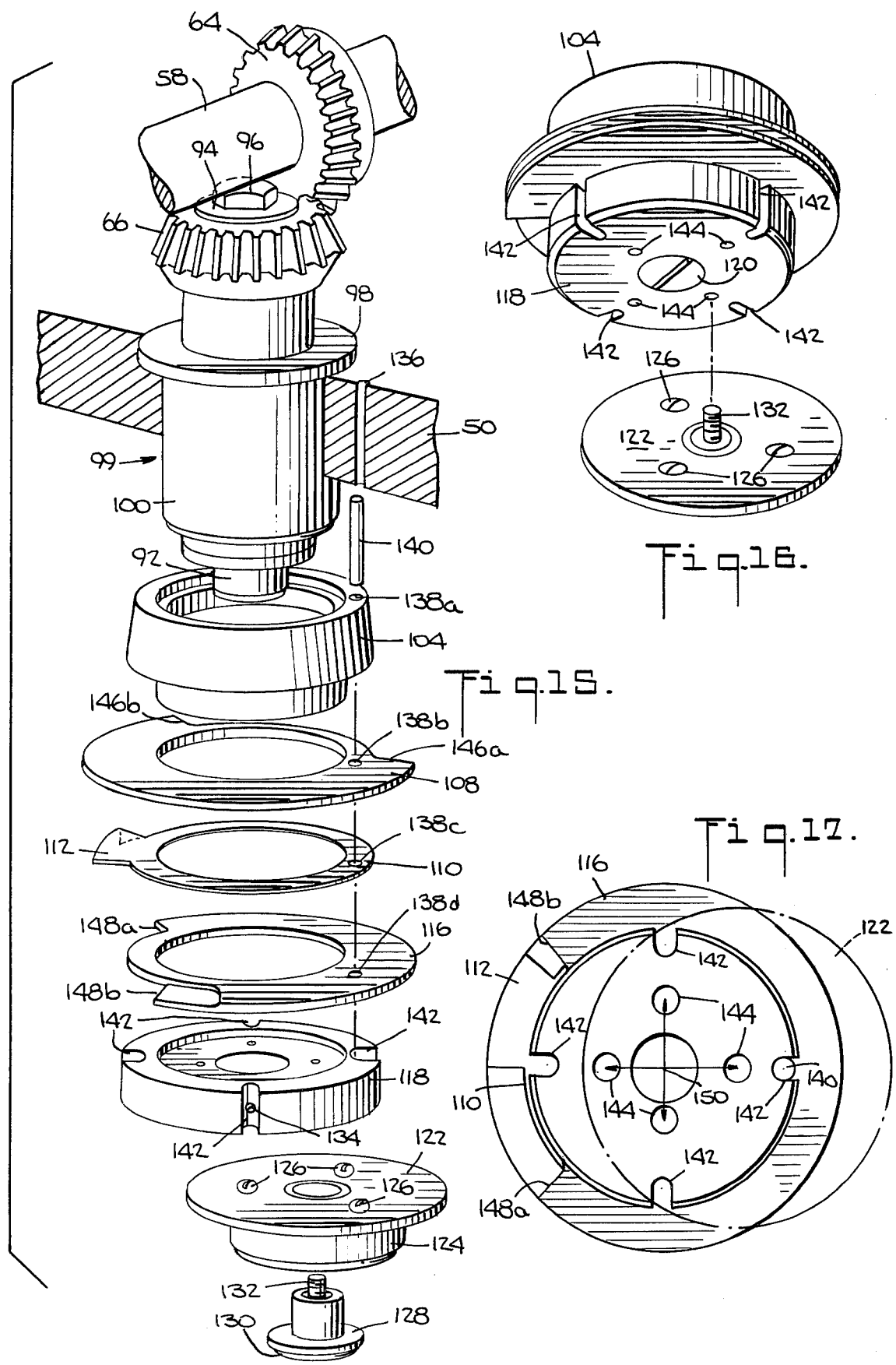

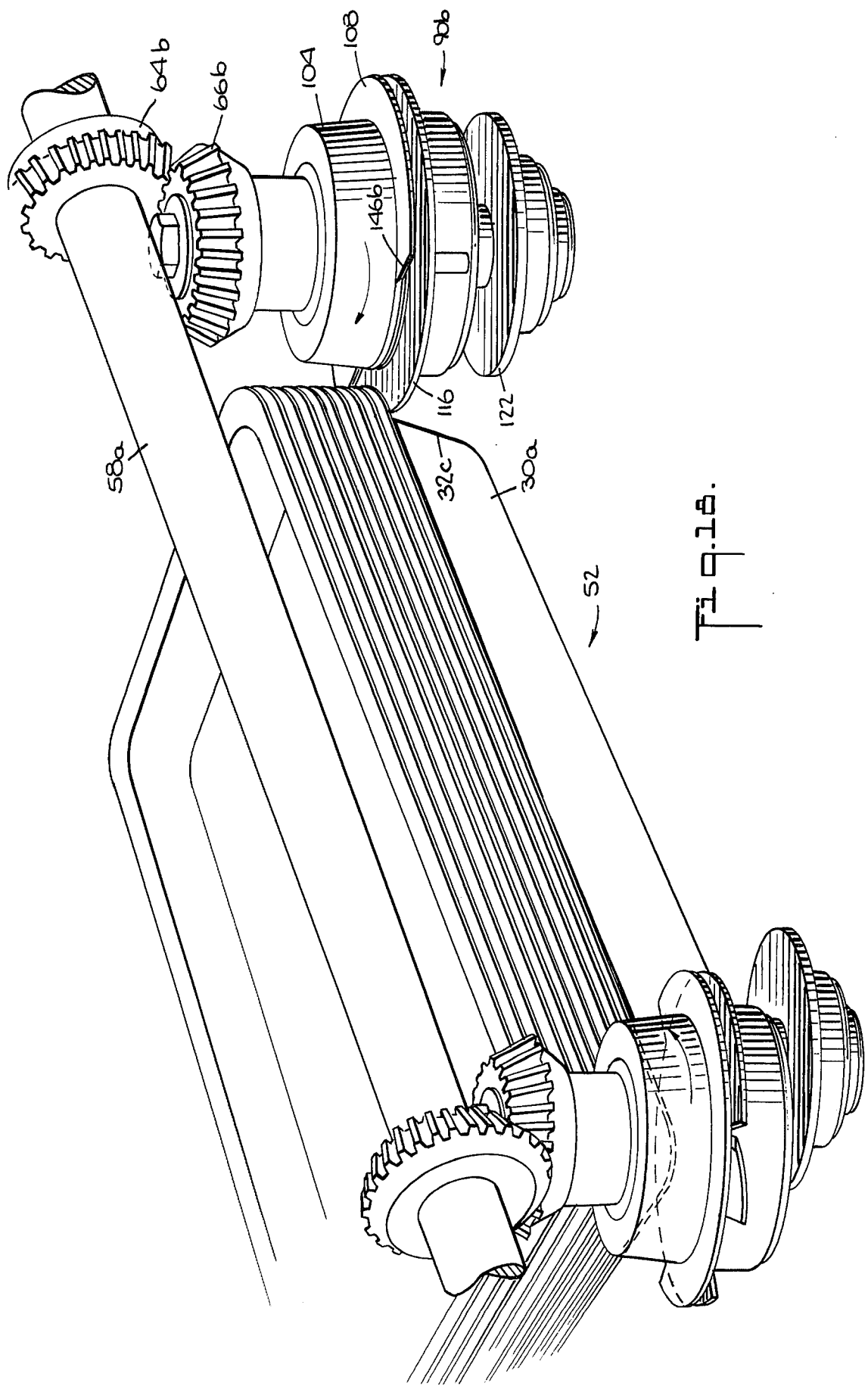

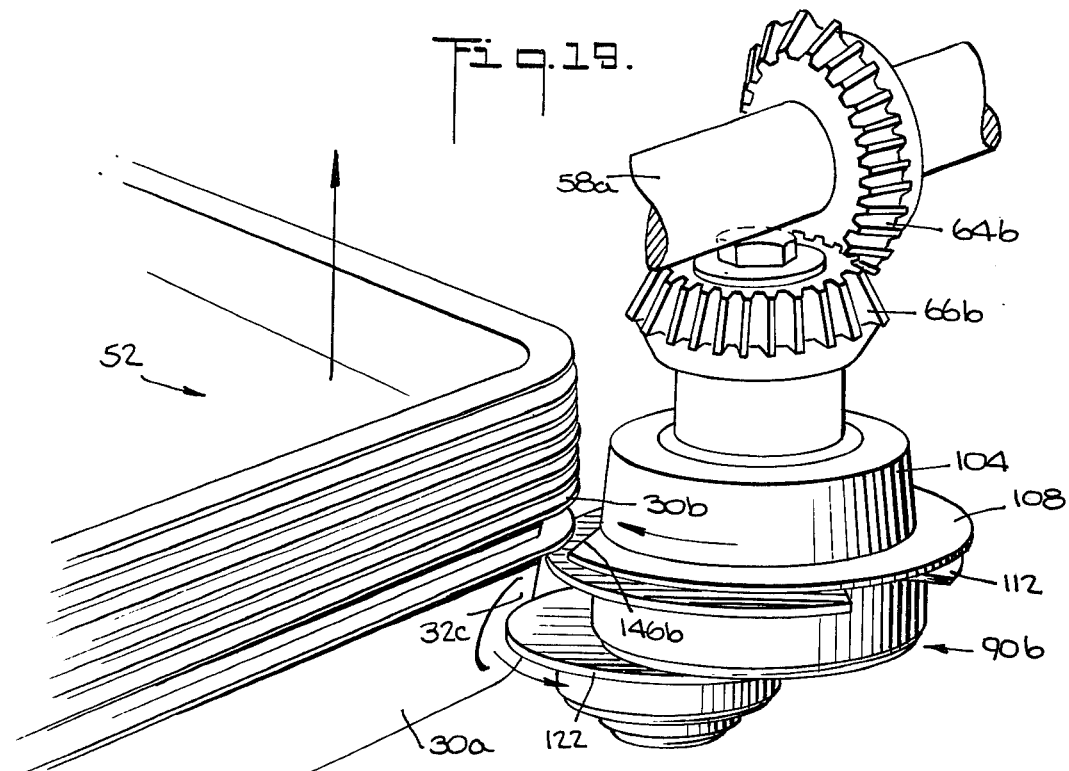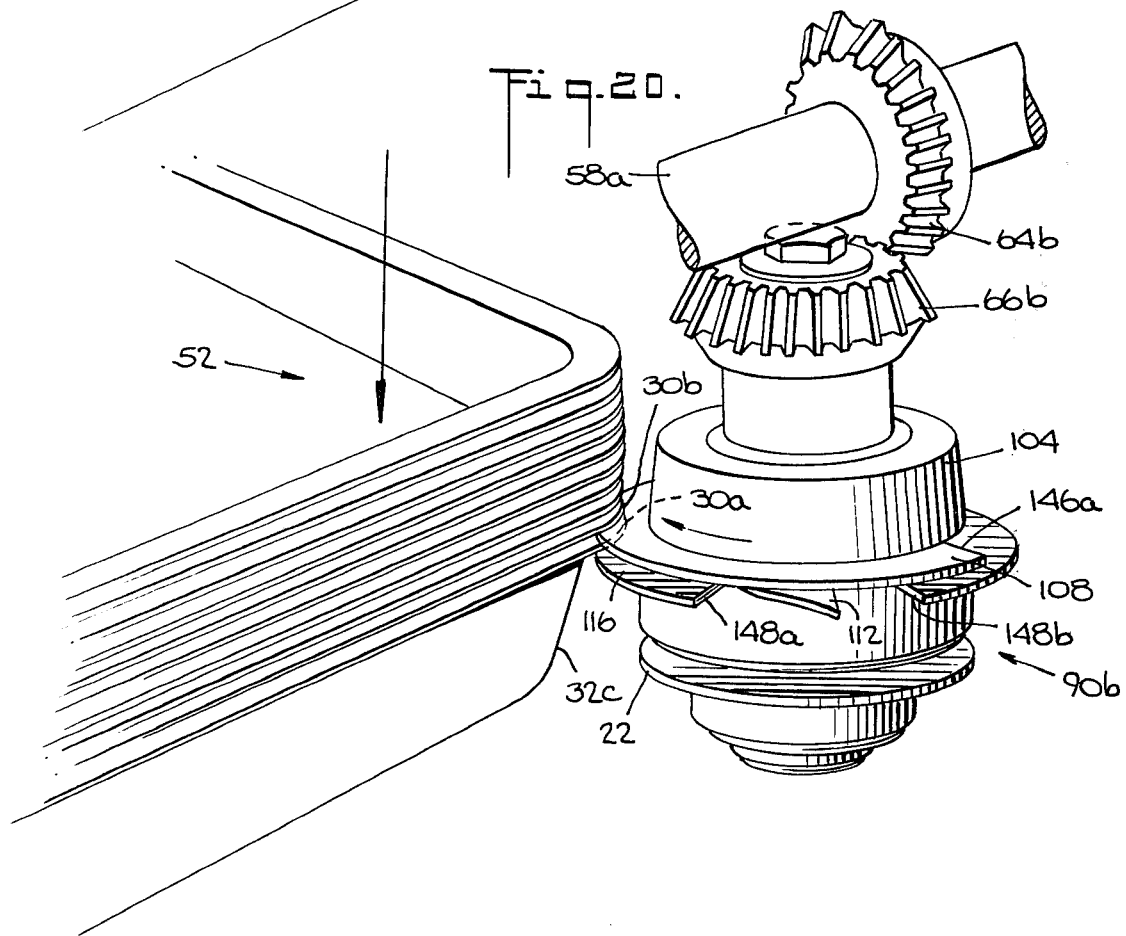

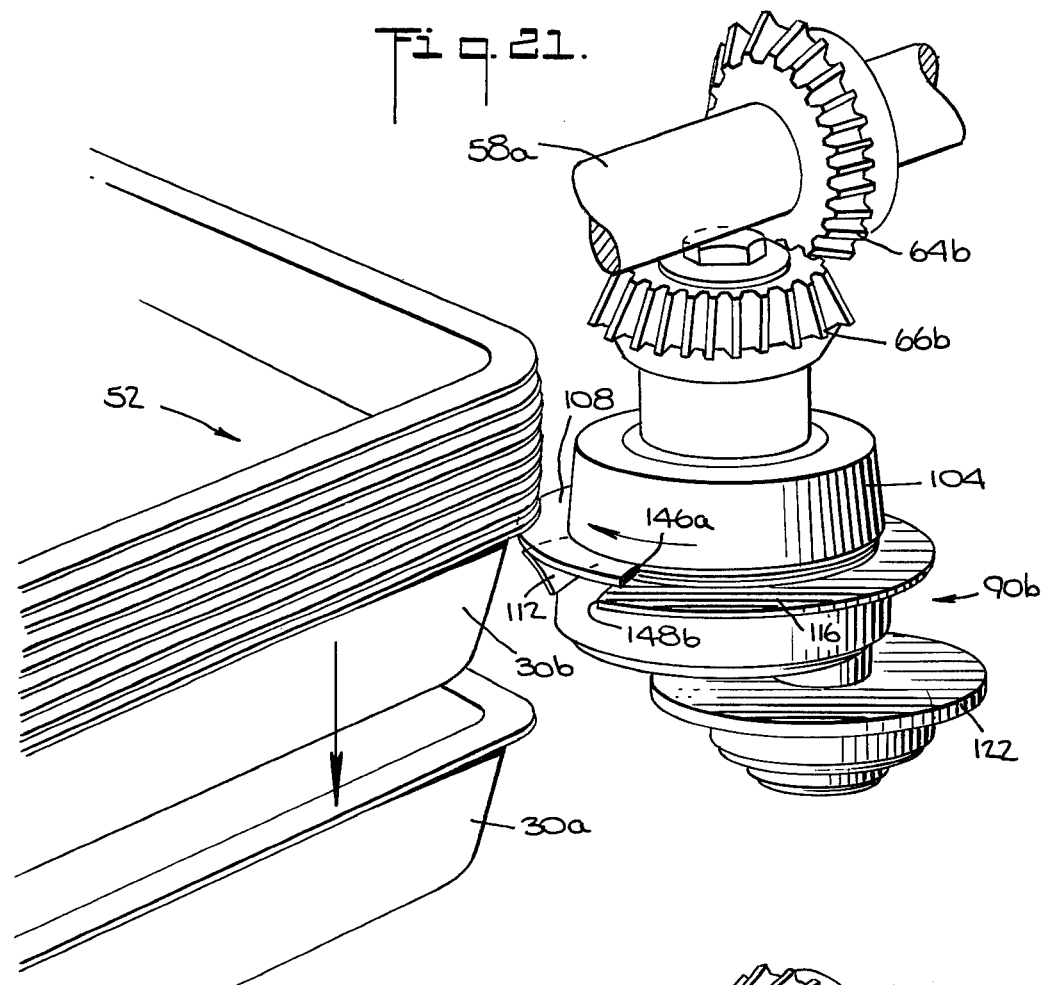
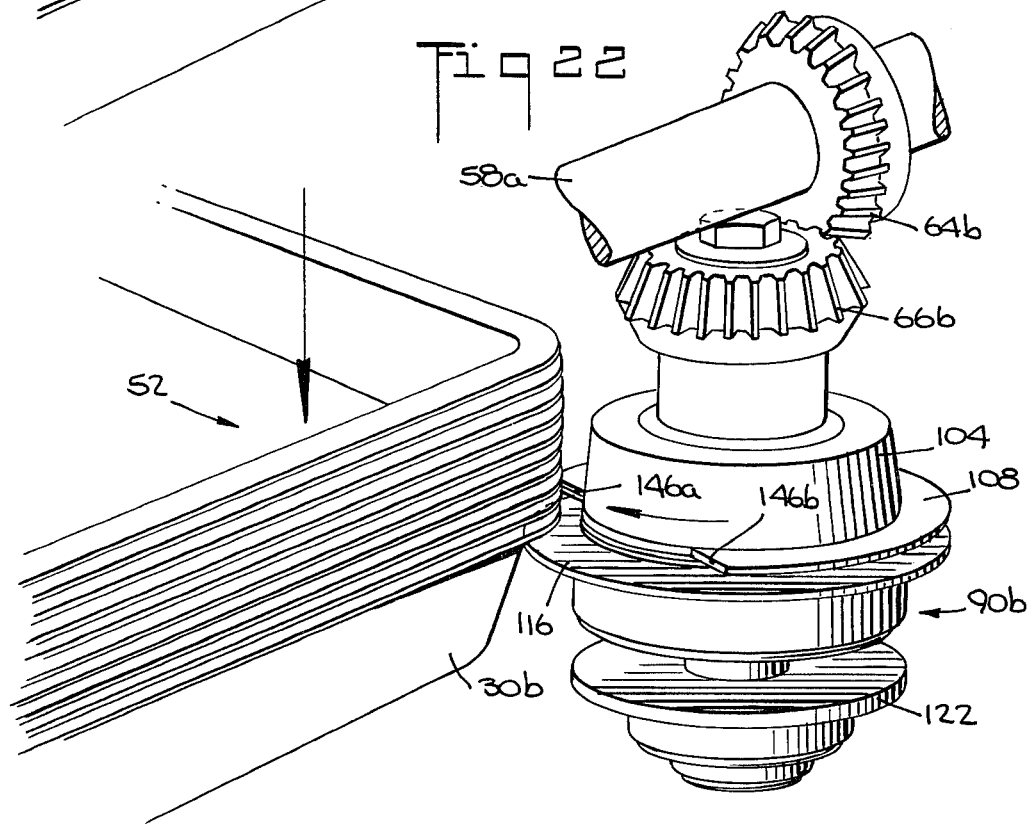

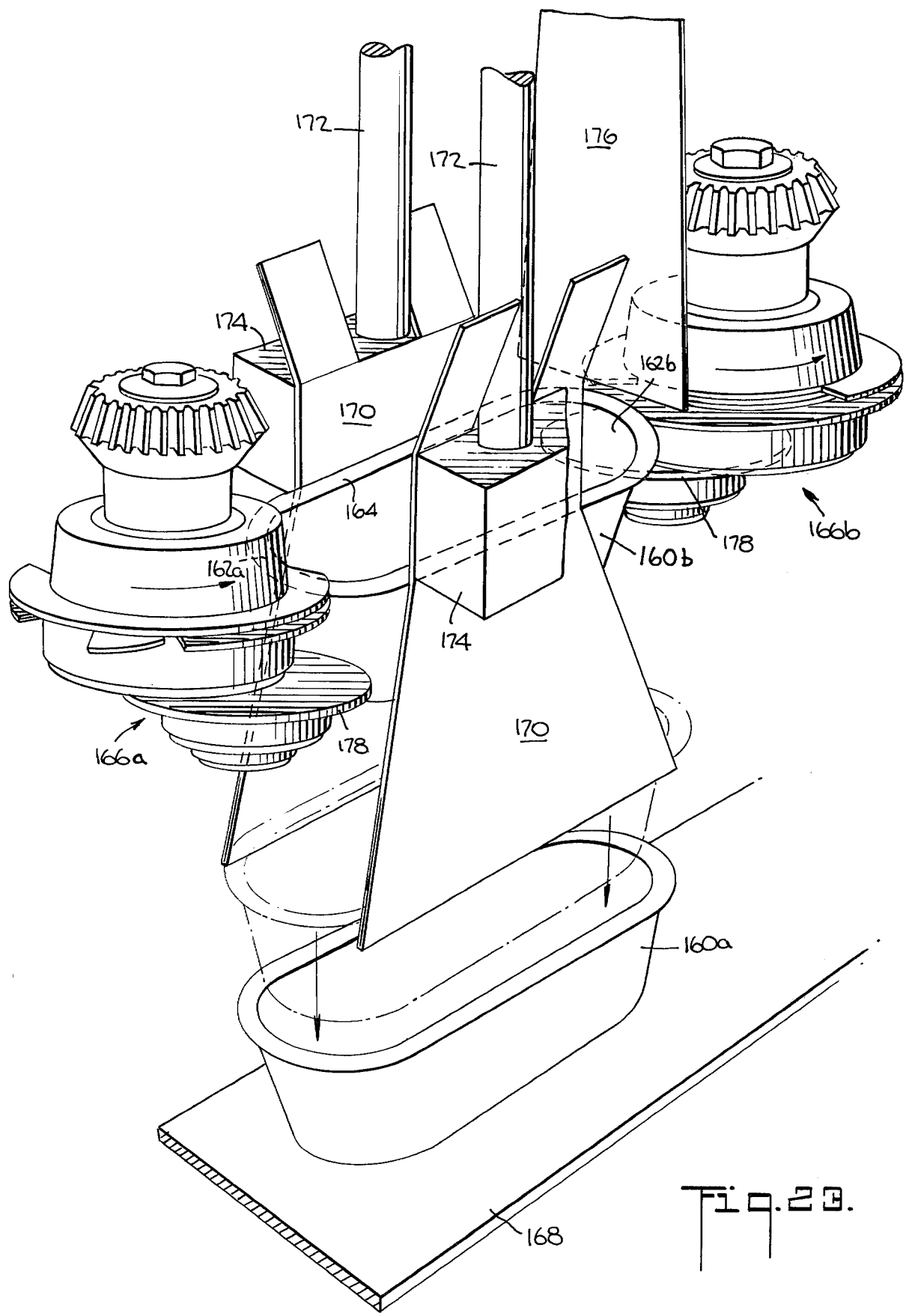

APPARATUS FOR AUTOMATICALLY DISPENSING NON-ROUND FLEXIBLE CONTAINERS

RELATED APPLICATIONS

This is a continuation-in-part of U.S. patent application Ser. No. 869,505, filed Jan. 16, 1978, now U.S. Pat. No. 4,180,180, entitled "Apparatus And Method For Automatically Dispensing Flexible Containers," and is hereby incorporated by reference.

BACKGROUND OF THE INVENTION

This invention relates to the automatic dispensing of non-round, flexible, elastic containers from nested stacks of such containers, and particularly to the dispensing of pressed or drawn, flanged paperboard containers having a water- or grease-resistant coating (for example, polyethylene or polyester) on the inner wall of the container.

Such containers are being used increasingly instead of metal foil containers in the food processing industry for a wide range of products, such as, pies and other bakery items. One advantage of paperboard containers is that they can be used in microwave ovens, whereas metal foil containers should not.

In many commercial food processing applications containers must be automatically dispensed one at a time at speeds of up to 150 containers per minute from the bottom of a nested stack of such containers and deposited onto holders on a traveling conveyor. The conveyor carries the containers through the other operations in the food processing sequence, including filling the empty containers with food. It is apparent that a reliable and accurate method must be used for automatically dispensing the containers one at a time and for depositing them on the carriers.

The usual apparatus for dispensing metal foil containers in continuous food processing machinery employs continuously rotating cooperating screws or rotors that separate and strip the bottommost plate from the vertical nested container stack while supporting the penultimate plate and the remainder of the stack. The screws or rotors typically comprise flat, annular plates having stepped flanges and channels to separate and dispense the bottommost plate in the stack.

These conventional screw-type machines for metal foil plates and containers, however, cannot be used without modification for pressed or drawn paperboard containers because of structural differences between metal and paperboard containers. Among these differences is a bead on the outer perimeter of the flange of the metal container. When beaded metal containers are nested, the beads create a space or cleavage between the adjacent flanges. A separator blade carried, for example, by the rotor of a screw-type dispensing machine can be easily inserted into the cleavage between the flanges of the bottommost and penultimate containers to separate the bottommost container from and to support the remainder of the stack. However, it is not feasible to provide beaded flanges on the pressed paperboard containers of the type used with the present invention.

Another structural difference is that paperboard containers are generally heavier than metal foil containers. This makes it more difficult to insert a separator blade between the flanges of paperboard containers as compared to metal containers, for the following reason. When the nested stack of paperboard containers is supported for dispensing on the rotors of a screw-type dispensing apparatus, the flange of the bottommost container is supported by the rotors. That flange is bent upward at the points of support due to the weight of the stack bearing down on the support points, causing the flange of the bottommost container to touch the flange of the penultimate container. Accordingly, there is no space between the flanges of the bottommost and penultimate containers into which a separator blade can be inserted.

A third difference is that aluminum and other metal containers can be manufactured to more exact tolerances than pressed or drawn paperboard containers. Thus, paperboard containers exhibit wider variations in flange size and other dimensions, making them more difficult than metal containers to dispense from a stack.

The art has attempted to overcome these problems associated with the use of paperboard containers principally by resorting to the use of vacuum-type dispensers. In one variation, the vacuum pick and slide method, a suction source carried by a movable arm contacts the bottommost plate on the stack. Movement of the arm separates (or "picks") the bottommost container from the stack. The plate is then deposited at the top of an inclined ramp on which the plate slides down onto the carrier. In another variation, the vacuum pick and place method, the bottommost plate is picked from the stack by a suction source carried by a movable arm and placed directly onto the carrier by the moving arm. These vacuum methods are slower, less reliable, and less economical than the dispenser of the present invention.

SUMMARY OF THE INVENTION

The present invention relates to apparatus and method for dispensing non-round, flexible, elastic, flanged containers having corners and non-vertical sides, from the bottom of a nested stack of the containers. Broadly, the apparatus comprises a base and a plurality of rotor assemblies to operate on the stack, each rotor assembly being rotatably mounted on the base for synchronized movement with respect to the one or more other assemblies. Each rotor assembly comprises support means, separating means, release means, and compressive means, wherein the support means, separating means, and release means are rotatably fixed with respect to each other and the compressive means is rotatably and eccentrically mounted with respect to the support means, separating means, and release means. The rotatability of the compressive means allows non-round trays, which cannot rotate, to be squeezed without cutting into and/or distorting the trays.

In other words, the apparatus comprises (a) a base; (b) support means on the base for supporting the nested stack of containers; (c) compressive means on the base for creating a gap between the flanges of the bottommost and penultimate container by applying opposing compressive forces to the sidewalls of said bottommost container to cause the containers nested in the bottommost container to rise vertically; (d) separating means on the base arranged and constructed for insertion into the gap created by said compressive means, said separating means also being arranged and constructed so that it may support the penultimate container and the remainder of the stack nested therein; and (e) release means for releasing the bottommost container from said base and from the remainder of the containers in said nested stack; one support means, one separating means, one release means, and one compressive means comprising a rotor assembly wherein the one support, separating, and release means are rotatably fixed with respect to each other, and the compressive means is rotatably and eccentrically mounted with respect to the support, separating, and release means.

Preferably, the rotor assemblies are positioned so that the support, compressive, separating, and release means operate on the sidewalls at the corners of the non-round containers. Usually, the support, separating, and release means comprise three discs having arcuate cut-outs on their peripheries, the discs being rotatably fixed on the shaft of the rotor assembly, and the compressive means comprises a squeezer wheel, rotatably and eccentrically mounted with respect to the other three discs.

The process of the present invention comprises the following steps: (a) providing an apparatus having a plurality of the foregoing rotor assemblies; (b) supporting a nested stack of non-round flexible, elastic containers, each of said containers having a sloped sidewall and a flange extending outward from the sidewall; (c) rotating the rotor assemblies to separate the flange of the bottommost container from the flange of the second to the bottommost (penultimate) container by compressing the sidewalls of the bottommost container; (d) rotating the rotor assemblies to insert supporting means in the space thereby created between the flanges of the bottommost and penultimate containers and decompress the side wall of the bottommost container; and (e) rotating the rotor assemblies to dispense the bottommost container from the remainder of the containers, preferably by removing support from the bottommost container while at the same time maintaining support for the remainder of the containers. Thereafter, these steps may be repeated to dispense additional containers from the nested stack of containers.

The present invention exploits the structural elasticity of pressed or drawn paperboard containers, a property which aluminum containers do not possess to any significant extent. Advantageously, the new rotor assemblies can be used with equipment now employing conventional screw-type dispensing apparatus.

U.S. Pat. Nos. 1,907,713 and 1,907,714 both to Benson, disclose screw-type paper cup dispensing apparatus wherein the beaded rim of the bottommost cup in a nested stack of cups is compressed to overcome the tendency of the bottommost cup to adhere to the rest of the stack and to insure that the cups feed properly. However, in the present invention the sidewalls of the containers, not their flanges, are compressed, and this compression is applied to the walls of the bottommost container in the nested stack to create a space between the flanges for receiving a separator blade, not, as in Benson's patents, to overcome the adhesion force between containers.

Furthermore, the paperboard containers used with the present invention have little or no tendency to adhere to one another, as do Benson's cups. First, the containers used herein, unlike Benson's containers, have walls which are not substantially vertical. Second, the polyethylene or polyethylene and polyester on the inner walls of the containers preferably used herein further diminishes the adhesion between the containers.

BRIEF DESCRIPTION OF THE DRAWINGS

To more fully describe the present invention, the following drawings are provided, in which:

FIG. 1 is a perspective view of a non-round container (or tray) that can be dispensed by means of the present invention.

FIGS. 2, 4, and 6 to 9 are diagramatic top views of the tray of FIG. 1 being operated on by rotor assemblies constructed in accordance with the present invention, showing possible locations and directions of rotation (set-ups) of the squeezer wheels of those assemblies;

FIGS. 3 and 5 are schematic top views of the trays of FIGS. 2 and 4, respectively, showing (to a somewhat exaggerated degree) the change in tray dimensions caused by the squeezer wheel rotations shown in FIGS. 2 and 4, respectively;

FIG. 10 is a perspective view of a machine embodying the present invention for dispensing trays one at a time from a stack of the trays of FIG. 1;

FIG. 11 is a top view of the machine of FIG. 10;

FIG. 15 is a partial, exploded view of the preferred rotor assembly;

FIG. 16 is a bottom, partially exploded, perspective view of the rotor assembly of FIG. 15;

FIG. 17 is a partial, bottom view of the rotor assembly of FIG. 15;

FIGS. 18 to 22 are sequential action views illustrating steps in the present process utilizing the apparatus of FIG. 10;

FIG. 23 is a partial, perspective view of a machine according to the present invention for dispensing trays having two corners, one at a time from a stack of such trays.

Figure 12:
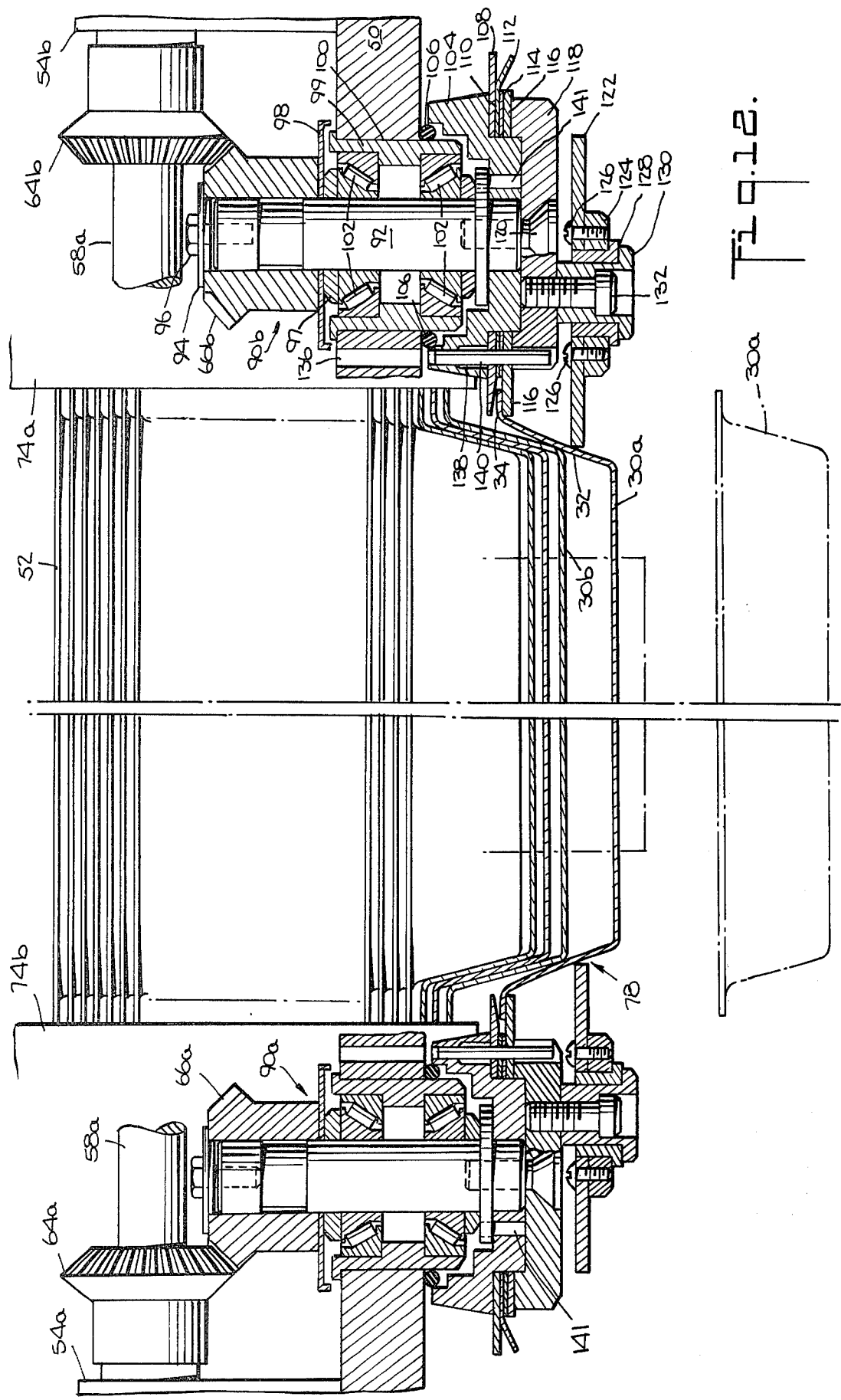
FIG. 12 is a partial, front, sectional view of the machine of FIG. 10 taken at line 12—12 of FIG. 11.

These drawings are provided for illustrative purposes only and are not intended to limit the scope of the invention.

DETAILED DESCRIPTION OF THE INVENTION

The trays employed with the present invention are non-round, that is, they have corners. For purposes of the present description, the word "corners" is to be given a broad meaning. Generally, the sides of a tray having the greatest curvature(s) will be considered to be the corners. Also, it should be understood that the terms "walls" and "sidewalls" as used herein include those portions of the corners between the tray bottom and flange.

In FIG. 1, non-round tray 30 has bottom 40, side walls 36a and b, side end walls 38a and b, unbeaded flange 34, and corners 32a, b, c, and d. The four walls 36a, 36b, 38a, and 38b, including the corners, 32a, b, c, and d, are non-vertical and slope inward from top to bottom.

The rotor assemblies of the present invention may be positioned to operate anywhere along the outside of the trays, but preferably operate at the corners, as shown in FIGS. 2 and 4. Corner placement is preferred for several reasons. First, if the tray is small, corner placement prevents interference of one rotor assembly with another. Second, apparatus using corner placement is less sensitive to dimensional variations of the tray than apparatus using side placement. For example, in a tray measuring 5 inches wide by 8 inches long, a one-eighth inch variation in width changes the diagonal by only one-sixteenth of an inch. Third, squeezing to make a space between the flanges of the bottommost and penultimate trays works best at the corners because the corners are rounded and, thus, less friction is encountered. Fourth, the flanges are strongest at the corners and, thus, tend to bend less when the tray is being supported there.

FIG. 2 shows rotor assemblies having squeezer wheels 42a, b, c, and d located at the corners of the tray wherein the axes of wheels 42a and d rotate clockwise and the axes of 42b and c rotate counter-clockwise. FIG. 3 indicates (to an exaggerated degree) the resulting lengthening and narrowing of the tray.

FIG. 4 shows the axes of squeezer wheels 42a and d rotated counter-clockwise and the axes of 42b and c rotated clockwise. FIG. 5 indicates (to an exaggerated degree) the resulting shortening and widening of the tray.

FIGS. 6 and 7 show side placement of the rotor assemblies wherein the axes of squeezer wheels 42a, b, c, and d all rotate clockwise or counter-clockwise, respectively. These set-ups are generally least preferred of those shown because they tend to cause the trays to "rack," that is, distort to a parallelogram having other than right angles (when viewed from the top). For example, in FIG. 6, side 36a will tend to move to the left and side 36b will tend to move to the right.

In FIG. 8, the axes of squeezer wheels 42a and d rotate clockwise, and the axes of wheels 42b and c, counter-clockwise. This results in tray elongation and narrowing, similar to that shown in FIG. 3.

In FIG. 9, the axes of squeezer wheels 42a and d rotate counter-clockwise, and the axes of 42b and c, clockwise. This results in tray shortening and widening, similar to that shown in FIG. 4.

Rotor assembly placement and rotation direction depend on the size and shape of the tray to be dispensed. For rectangular trays, the set-up of FIG. 2 is generally preferred. For square trays, the set-ups of FIGS. 2 and 4 are equally preferred. For rectangular trays, the set-ups of FIGS. 8 and 9 are less preferred, and the set-ups of FIGS. 6 and 7 are least preferred because sometimes the penultimate tray and the bottommost tray are squeezed at the same time and the required space or gap between them is not made.

FIG. 10 is a perspective view of a machine embodying the present invention for dispensing the tray shown in FIG. 1 from a stack of such trays. The machine has base 50 supported by legs 82 and opening (or cut-out) 78 in the base through which trays 30 dispensed from the bottom of stack 52 fall one at a time onto conveyor belt 80. (It should be understood that one machine may dispense trays from several stacks at the same time; however, for simplicity a one-stack machine is shown and described.)

External drive means (not shown), for example, a motor, rotates shaft 56 and mitre gears 60a and b fixedly mounted thereon, the shaft being rotatably mounted on base 50 by journal blocks 54c and d. This, in turn, rotates mitre gears 62a and b, which are meshed with gears 60a and b, respectively. Gears 62a and b are fixedly mounted on shafts 58a and b, which shafts are rotatably mounted on base 50 by journal blocks 54a and b, and 54e and f (not shown), respectively. Rotation of shaft 58a and mitre gears 64a and b, fixedly mounted thereon, rotates mitre gears 66a and b, which are meshed with 64a and b, respectively. Rotation of shaft 58b and mitre gears 64c and d (not shown), fixedly mounted thereon, rotates mitre gears 66c and d (not shown), which are meshed with 64c and d, respectively.

Mounting blocks 70a and b (not shown) support stack guides 74a and b (not shown), respectively. Mounting blocks 68a and b (not shown) support stack guides 72a and b (not shown), respectively. Stack guides 76a and b (not shown) extend below the bottom of base 50 and will be further described below.

In FIG. 11, a top view of the machine of FIG. 10, journal block 54f, mitre gears 64d and 66d, mounting blocks 68b and 70b, and stack guides 72b, 74b, and 76b, none of which is shown in FIG. 10, may be seen.

In FIG. 12, a partial, front, sectional view of the machine of FIG. 10 taken at line 12—12 of FIG. 11, two rotor assemblies, indicated generally as 90a and b, are shown. Only assembly 90b will be described, assembly 90a being a mirror image thereof.

Shaft 92 (grease stem) is rotatably mounted in base 50 by roller bearing assembly 99 containing rollers 102 and having roller bearing sleeve 100. Mitre gear 66b, which meshes with mitre gear 64b, is attached to shaft 92 by two set screws (not shown) through the side of the gear into the shaft. Gear cap 94 is held in place by screw 96, which adjusts the pre-load on roller bearing assembly 99. Top shield 98 rides on ring 97 and, therefore, rotates with the inner portion of the roller bearing assembly. O-ring 106, which does not rotate, prevents dust from reaching the roller bearings.

Screw 120 connects the bottom portion of the rotor assembly to the bottom of shaft 92. This bottom portion comprises blade hub 104 and mounting cup 118. Between them are several concentrically and fixedly mounted discs; separator blade 108, wiper blade 110 having cam 112, shim 114 (providing extra spacing, if required, because of the tray flange thickness), and top disc 116.

The squeezer wheel assembly is eccentrically mounted in mounting cup 118 by bearing stud 130 and screw 132. Squeezer wheel 122 is attached to squeezer wheel hub 124 by screws 126. Flange bearing 128 is press-fitted into hub 124, and squeezer wheel 122, hub 124, and bearing 128 rotate around stud 130 as a unit. Timken tapered roller bearings and Oilite flange bearings have been found suitable for some applications.

To insure that separator blade 108, wiper blade 110, shim 114 (if needed), and top disc 116 are rotationally aligned, each is provided with a hole that must be lined up with a hole in blade hub 104 and a hole in mounting cup 118. The entire passageway formed by the aligned holes is indicated by reference numeral 138. Pin 140 is press-fitted into passageway 138, and the pin maintains the several parts in alignment during operation. Each hole 136 allows a narrower pin (not shown) to be dropped through it into the top of hole 138 to insure that all rotor assemblies have been properly mounted to operate in sync. Pin 141 maintains hub 104, and thus the rest of the assembly (via pin 140), in alignment with shaft 92.

In FIG. 12, flange 34 of bottommost tray 30a is resting on top disc 116, and squeezer wheel 122 is pushing against corner 32, thus forcing penultimate tray 30b (and the remainder of the stack of trays) to rise vertically. The position of tray 30a as it later will be dropped from stack 52 is shown in phantom lines. (Note that distances shown between the flanges of the trays in stack 52 have been exaggerated for clarity.)

Figure 13:
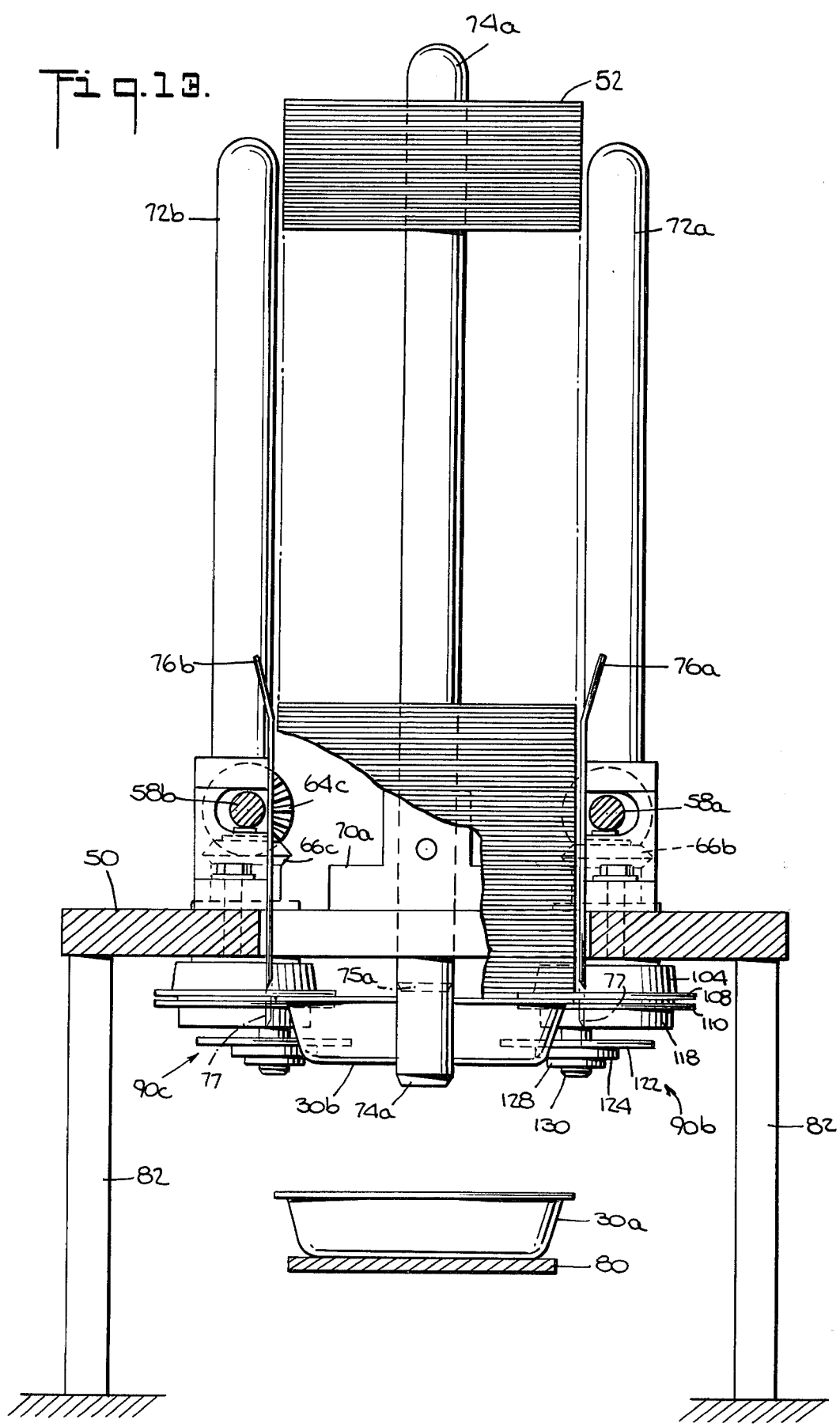
FIG. 13 is a partial, side, sectional view of the machine of FIG. 10 taken at line 13—13 of FIG. 11.

FIG. 13 is partial, side, sectional view of the machine taken at line 13—13 of FIG. 11. Guides 76a and b extend below the bottom of base 50 to almost the bottom of the stack. Guides 74a and b extend below the bottom of the stack and help keep tray 30a from tipping as it descends to conveyor belt 80.

Both sets of guides are closely adjacent to the stack. In this embodiment the tray is being compressed by squeezer wheels whose axes are rotating as shown in FIG. 4. This causes widening and shortening of the tray (the width is the left-to-right distance of the tray in FIG. 13). If guides 76a and b extended to the flange of the bottom tray in the stack, the bottom tray, when compressed by the squeezer wheels 122 (and, thus, widened) might jam against those guides. Because this rotor assembly set-up causes the tray to shorten (the distance perpendicular to the view of the trays in FIG. 13), guides 74a and b may extend to or beyond the bottom of the stack.

If the set-up of FIG. 2 were used, the tray would tend to narrow and lengthen, and guides 76a and b could extend below the bottom of the stack to the position shown by phantom lines 77, but guides 74a (and b) would have to be raised above the flange of the tray being squeezed, to the position shown by phantom line 75a. One or the other set of guides should extend below the flange of the tray being squeezed (and, if necessary, almost to the conveyor) to help prevent the tray dispensed from tipping before it reaches the conveyor.

Figure 14:
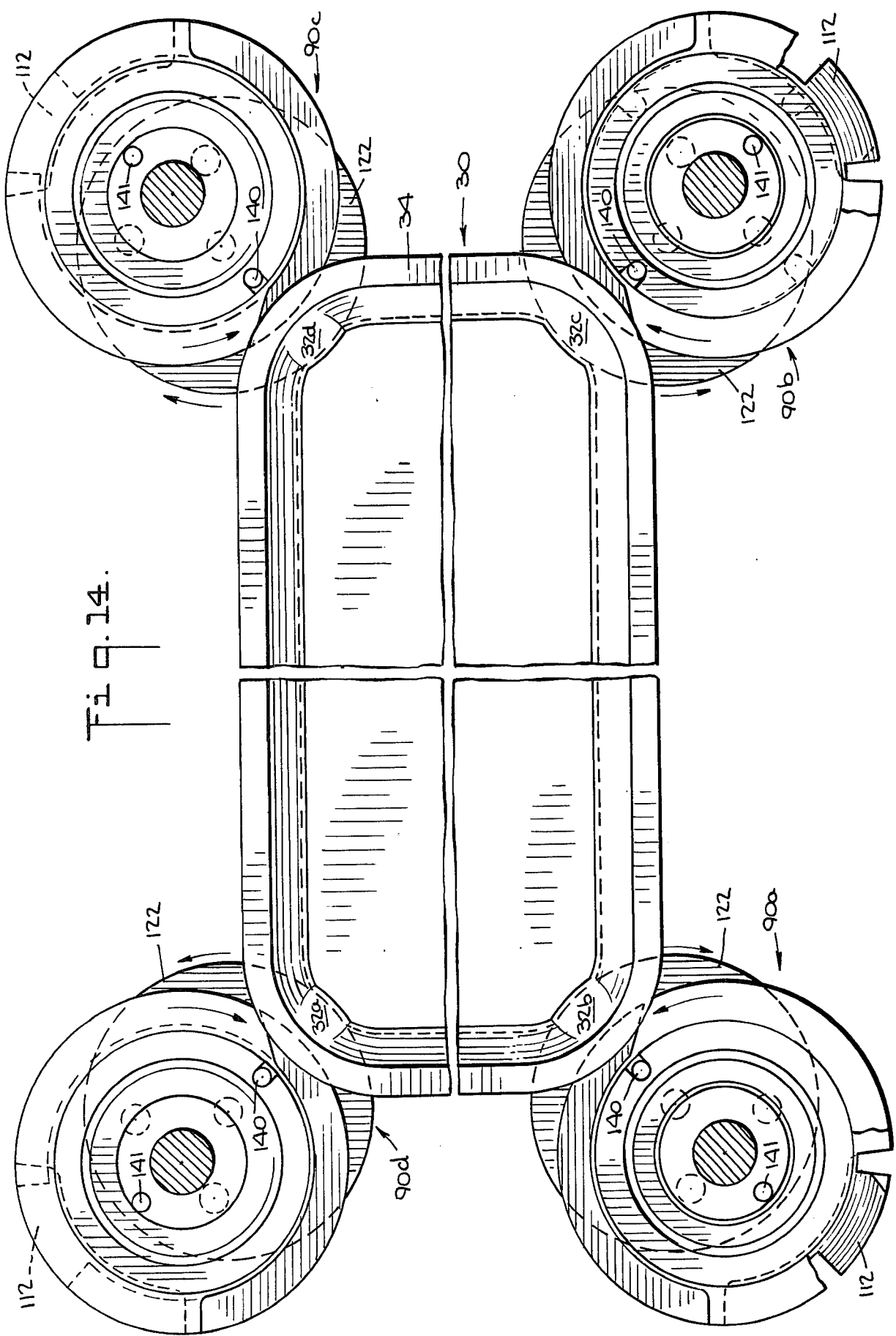
FIG. 14 is a partial, top view of the machine of FIG. 10 showing the squeezer wheels of the four rotor assemblies compressing the corners of the lowest tray in the stack of trays.

FIG. 14 is a partial, top view of the machine of FIG. 10. Rotor assemblies 90a and c rotate counterclockwise and 90b and d rotate clockwise. Each of the respective squeezer wheels, however, rotates in the direction opposite that of the rest of the assembly because of frictional engagement of the wheel against the respective tray corner, 32a, b, c, or d. Deformation of the corners, due to compression of the squeezer wheels 122, is shown.

FIG. 15 is a partial, exploded view of a rotor assembly built in accordance with the present invention. Mitre gears 64 and 66 are meshed, and rotation of shaft 58 causes gear 66 to rotate. As described above, gear 66 is fixedly connected to shaft 92 (as shown in FIG. 12) by two set screws (not shown). Gear cap 94 is held in place by screw 96. The shaft is rotatably mounted in base 50 by means of roller bearing assembly 99 having sleeve 100. Blade hub 104, separator blade 108, wiper blade 110, top disc 116, and mounting cup 118 are fixedly connected to shaft 92 by screw 120 (see FIGS. 12 and 16). Holes 138a, b, c, d, and cut-out 142 in hub 104, blade 108, blade 110, disc 116, and cup 118, respectively, comprise passageway 138 (see FIG. 12) for pin 140. The pin maintains the alignment of these elements with respect to one another during operation. Hole 136 in base 50 allows a pin (not shown) to be temporarily placed in the top of hole 138a for timing (synchronization) purposes. There are four cut-outs 142 spaced at 90 degrees on the periphery of cup 118. This allows cup 118 to be placed in any one of four positions before screw 120 is tightened. (The reason for this will be explained below.)

Separator blade 108 has an arcuate cut-out around its periphery defined by edges 146a and b. Wiper blade 110 is smaller in outer diameter than blade 108 except for downwardly turned cam 112 on the wiper blade's periphery. Top disc 116 has an arcuate cut-out around its periphery defined by edges 148a and b. These three discs are arranged so that the cut-out of the separator blade is above a portion of the top disc that is not cut out, the cut-out of top disc 116 is below a portion of the separator blade that is not cut-out, and cam 112 is above the cut-out of top disc 116.

Separator blade 108, wiper blade 110, and top disc 116 are essentially circular, but for certain trays, other blade and disc shapes may be required. In some cases, where the tray flange is too narrow and sidewall compression moves the flange in too far, a bump or protuberance may be provided on the top disc to reach far enough in to contact and support the flange.

Squeezer wheel 122 is attached to squeezer wheel hub 124 by screws 126, and the squeezer wheel, hub 124, and flange bearing 128 rotate about bearing stud 130 as a unit. Screw 132 connects bearing stud 130 to mounting cup 118. Squeezer wheel 122 is, thus, free to rotate with respect to the rest of the rotor assembly.

FIG. 16 is a bottom perspective view of the rotor assembly of FIG. 15. As previously described, cup 118 can be placed in any of four positions before screw 120 is tightened. This allows any one of the four holes 144 to be brought into position to receive screw 132.

Referring to FIG. 17, because the holes 144 are at different distances from axis 150, the axis of rotation of squeezer wheel 122 can be made closer to or farther from axis of rotor assembly rotation 150, depending on in which one of the four positions mounting cup 118 is placed. Accordingly, the distance the edge of squeezer wheel 122 extends past the edge of discs and blades 108, 110, and 116 (and, therefore, the amount of squeeze) can be varied.

FIGS. 18 to 22 are sequential action views illustrating the steps of the present process carried out using the machine of FIG. 10. In FIG. 18, rotor assembly 90b is positioned such that the flange of tray 30a at corner 32c rests on top disc 116. (For convenience, the operation at only one corner of the tray will be described; however, it should be understood that the rotor assemblies at diagonally opposite corners are the same and that the two pairs of assemblies are mirror images of each other.) The entire stack 52 is nested in tray 30a and is, therefore, supported by the four top discs 116. The arrow on blade hub 104 indicates the direction of rotation of the rotor assembly. Because squeezer wheel 122 is not touching tray 30a, the wheel rotates as a unit with the rest of the rotor assembly.

FIG. 19 shows rotor assembly 90b rotated approximately 90 degrees from its position in FIG. 18. Squeezer wheel 122 has now contacted and frictionally engaged corner 32c of tray 30a. Accordingly, wheel 122 is rotated about its axis in the direction opposite to that shown for the rest of the rotor assembly. Compression of the four corners by the squeezer wheels forces penultimate tray 30b and the remainder of the trays of stack 52 to rise vertically, as shown by the arrow above the stack, thereby creating a gap between the flanges of bottom tray 30a and penultimate tray 30b. Continued rotation of assembly 90b brings separator blade into position between the flanges at the corners while maintaining compression.

For most shapes and sizes of trays having corners, it is best if the trays are squeezed by the squeezer wheels no higher than half-way up the sides of the trays. Squeezing higher may cause the penultimate tray in a stack to become trapped within the bottommost tray and, thus, fail to produce the required gap. However, for some trays, such as the one shown in FIGS. 23 and 24, squeezing above the middle is preferred.

The circumferential side of the squeezer wheel may have any shape (e.g., V-shaped, stepped, knurled, or chiselled) but usually it will be flat because of ease of manufacture. Preferably if flat, it will be approximately square (90 degrees) to the wheel faces. The degree of sharpness of the portion of the wheel squeezing the tray is determined by the slope of the tray side, the thickness of the sidewall, the material from which the tray is made, the weight of the stack, and the amount of squeeze required. If the portion of the wheel contacting and squeezing the tray is too sharp, during compression the wheel may bite through the wall of the bottommost tray to the penultimate or even the antepenultimate tray. If not sharp enough, all the trays in the stack will rise. In either case, the required gap between the flanges of the bottommost and penultimate trays will not form.

In FIG. 20, assembly 90b has been further rotated so that squeezer wheel 122 no longer contacts and compresses corner 32c of tray 30a. Accordingly, squeezer wheel 122 no longer rotates on its own axis with respect to the rest of the rotor assembly as it did in FIG. 19. Because of the decompression, penultimate tray 30b and those nested in it have moved down, as indicated by the arrow above stack 52.

The flange at corner 32c of tray 30a rests on top disc 116, and the flange at the corner of tray 30b rests on separator blade 108. Thus, all the trays above tray 30a in stack 52 are resting on separator blade 108. The distance between blade 108 and disc 116 should be large enough so that blade 108 does not rub the flange of bottommost tray 30a when tray 30a is resting on disc 116. If wiper blade 110 is not thick enough to provide the required spacing, shim 114 may be added, as shown in FIG. 12.

Continued rotation of assembly 90b (FIG. 21) brings edge 148a (shown in FIG. 20) and the rest of the arcuate cut-out of top disc 116 under the flange at the corner of tray 30a. This allows tray 30a to fall, and penultimate tray 30b becomes the bottommost tray in the stack.

In high speed operation, gravity alone may not be sufficient to cause tray 30a to fall quickly enough. Therefore, cam 112 on wiper blade 110 is provided (see FIGS. 12 and 15). If tray 30a had not fallen out of the way by the time cam 112 had contacted it (a few degrees of rotation beyond the position shown in FIG. 21), the cam would have pushed the flange at the corner of the tray down. Note that tray 30b and those nested in it are still being supported by the separator disc 108.

Referring to FIG. 22, further rotation of assembly 90b brings the arcuate cut-out of separator disc 108 (defined by edges 146a and b) under the flange at the corner of tray 30b. This allows the entire stack of trays to fall, as indicated by the vertical arrow above the stack. The bottommost tray, 30b, and all the trays in stack 52 nested therein are supported by top disc 116. The positions of the rotor assembly and stack shown in FIG. 22 are the same as those shown in FIG. 18, except that tray 30a has been dispensed and tray 30b is now the bottommost tray in the stack. Thus, one cycle has been completed.

FIG. 23 is a partial, perspective view showing an apparatus employing the present invention for dispensing oblong trays 160 having corners 162a and b and flange 164. (For simplicity, the base, gear system, etc., of the machine, and the rest of the stack of trays are omitted.) Two rotor assemblies, 166a and b, one at each corner of the tray, are employed. The stack rests between side guides 170, side rods 172 mounted in blocks 174, and guides 176 (only one of which is shown). In FIG. 23, tray 160a has been dispensed from the bottom of the stack and has landed on conveyor belt 168, making tray 160b the bottommost tray in the stack. Rotor assemblies 166a and b are essentially the same as rotor assemblies 90a, b, c, and d shown in FIGS. 10 to 22. Preferably, the distance between the bottom of side guides 170 and conveyor belt 168 is less than the height of each tray 160 to insure that the tray lands upright.

Figure 24:
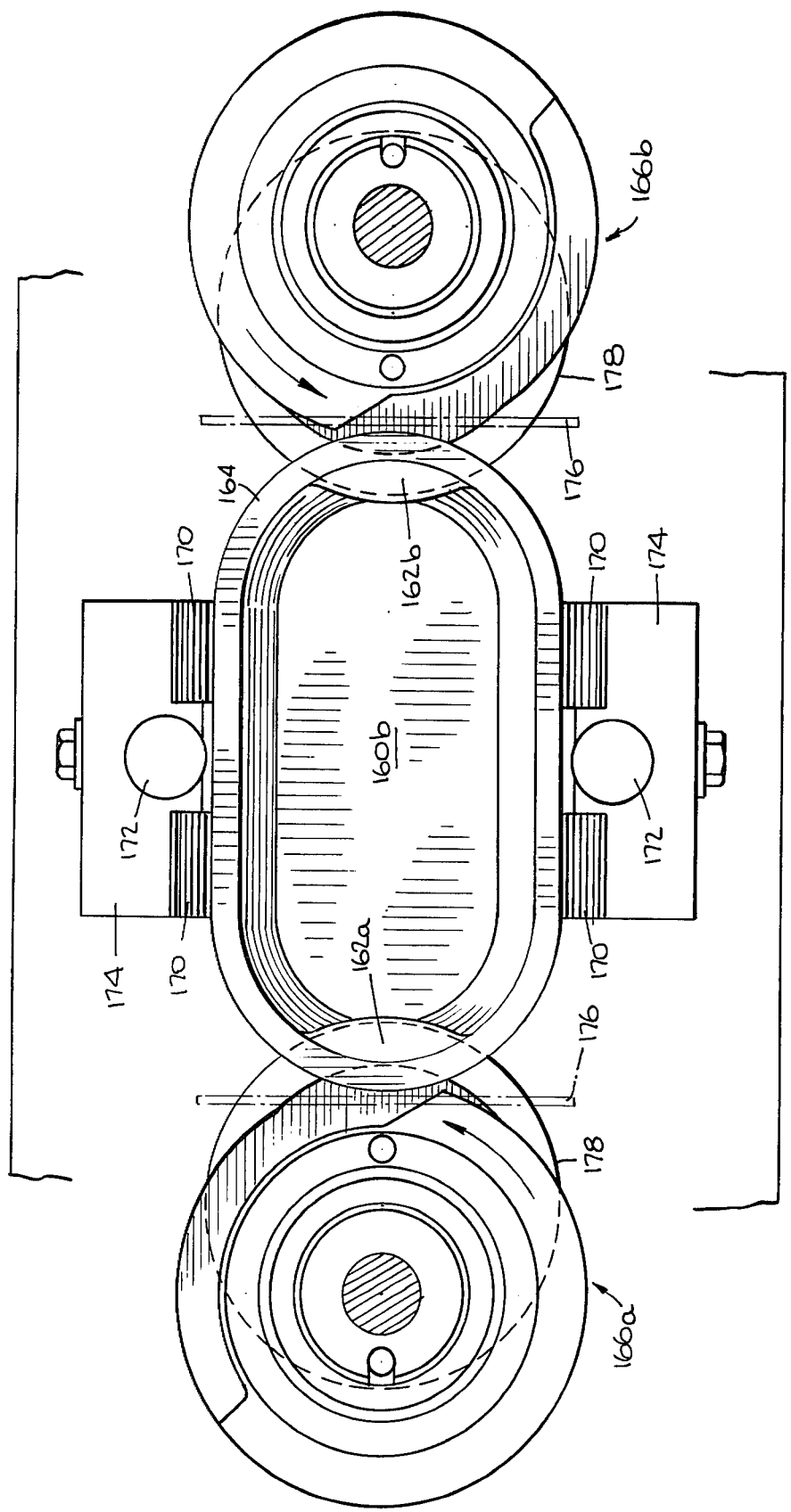
FIG. 24 is a partial, top view of the machine of FIG. 23 showing the two rotor assemblies compressing the corners of the lowest tray in the stack of trays.

FIG. 24 is a partial, top view of the system of FIG. 23. In FIG. 24, rotor assemblies 166a and b have been rotated so that squeezer wheels 178 deform corners 162a and b of the bottommost tray in the stack. This causes the penultimate tray and all those nested in it to rise, creating a gap between the flanges of the bottommost and penultimate trays. The separator discs will be rotated so that they are inserted into the gap, and the cycle will proceed as described above (see text accompanying FIGS. 18 to 22). Both rotors in this embodiment are identical and rotate in the same direction. The rotors may also be mirror images of each other and rotate in opposite directions if the side guides can be positioned to prevent displacement of the trays to one side or the other.

In practicing the present invention, the novel rotor assemblies will usually be placed at the corners of the tray. The sizes of the various components of the rotor assembly should be machined accurately and may be selected easily by one skilled in the art. Obviously, there is a range of suitable component sizes for any one tray. Among the factors influencing the size of the assembly are size and shape of the tray, desired maximum dispensing rate (trays/unit of time), mechanical properties of the material(s) of construction (e.g., machinability), space available for the machine, and cost.

For a tray having the shape of that shown in FIG. 1 and measuring approximately 5 inches wide by 7 and 11/16 inches long by 1 inch deep and having a $\frac{1}{4}$-inch wide flange, a rotor assembly having the following dimensions (approximately) has been found suitable. Referring to FIG. 12, the overall height (top of screw 96 to bottom of bearing stud 130) is 3 and $\frac{7}{8}$ inches; the top of squeezer wheel 122 is $\frac{5}{8}$ inch from the bottom; mounting cup 118 is 11/16 inch from the bottom; the top of blade hub 104 is 1 and 13/16 inches from the bottom; the top of top shield 98 is 2 and $\frac{3}{4}$ inches from the bottom.

Separator blade 108 and top disc 116 are 2 and 15/16 inches in outer diameter and 0.06 inch thick; wiper blade 110 is 2 and $\frac{3}{8}$ inches outer diameter, not including cam 112, 2 and 15/16 inches outer diameter including cam 112, and 0.03 inch thick; squeezer wheel 122 is 2 and $\frac{3}{8}$ inches in diameter and $\frac{1}{8}$ inch thick. The axis of rotation of squeezer wheel 122 is $\frac{1}{2}$ inch from the axis of rotation of the rest of the rotor assembly. The arcuate cut-outs on separator blade 108 and top disc 116 extend approximately 130 and 90 degrees, respectively, around the respective peripheries. Cam 112 on wiper blade 110 subtends a 37 degree angle.

Modifications and variations will be obvious to one skilled in the art, and the claims are intended to cover all such modifications and variations as fall within the true spirit and scope of this invention.

I claim:

1. An apparatus for dispensing non-round, flexible, elastic, flanged containers having corners and non-vertical sides, from the bottom of a nested stack of the containers, said apparatus comprising:
(a) a base; and
(b) a plurality of rotor assemblies to operate on the stack, each rotor assembly being rotatably mounted on the base for synchronized movement with respect to the one or more other assemblies and comprising:
   (i) support means;
   (ii) separating means;
   (iii) release means, and
   (iv) compressive means;
wherein the support means, separating means, and release means are rotatably fixed with respect to each other and the compressive means is rotatably and eccentrically mounted with respect to the support means, separating means, and release means.

2. The apparatus of claim 1 wherein the support means comprises a top disc; the separating means comprises a separator blade; the release means comprises a wiper blade; and the compressive means comprises a squeezer wheel.

3. The apparatus of claim 1 wherein each rotor assembly is positioned on the base to operate on a corner of the container.

4. An apparatus for dispensing non-round, flexible, elastic, flanged containers having corners and non-vertical sides, from the bottom of a nested stack of the containers, said apparatus comprising:
(a) a base;
(b) support means on the base for supporting said nested stack of containers;
(c) compressive means on the base for creating a gap between the flanges of the bottommost and penultimate container by applying opposing compressive forces to the sidewalls of said bottommost container to cause the containers nested in the bottommost container to rise vertically;
(d) separating means on the base arranged and constructed for insertion into the gap created by said compressive means, said separating means also being arranged and constructed so that it may support the penultimate container and the remainder of the stack nested therein; and
(e) release means for releasing the bottommost container from said base and from the remainder of the containers in said nested stack;
one support means, one separating means, one release means, and one compressive means comprising a rotor assembly wherein the support, separating, and release means are rotatably fixed with respect to each other and the compressive means is rotatably and eccentrically mounted with respect to the support, separating and release means.

5. The apparatus of claim 4 wherein each support means comprises a top disc; each separating means comprises a separator blade; each release means comprises a wiper blade; and each compressive means comprises a squeezer wheel.

6. The apparatus of claim 4 wherein each rotor assembly is positioned on the base to operate on a corner of the containers.

7. A rotor assembly for use in an apparatus for dispensing non-round, flexible, elastic, flanged containers having corners and non-vertical sides, from the bottom of a nested stack of said containers, said apparatus having a base and external drive means; said rotor assembly comprising:
(a) a shaft journaled to the base for rotation;
(b) means on the shaft for coupling the shaft to the external drive means for rotating the shaft;
(c) a top disc;
(d) a separator blade;
(e) a wiper blade; and
(f) a squeezer wheel;
wherein the top disc, separator blade, and wiper blade are fixedly mounted with respect to each other on the shaft, and the squeezer wheel is eccentrically and rotatably mounted with respect to the top disc, separator blade, and wiper blade on the shaft.

8. The rotor assembly of claim 5 wherein
(a) the separator blade has an arcuate cut-out on its periphery;
(b) the top disc has an arcuate cut-out on its periphery; and
(c) the wiper blade has a cam extending from its periphery and is positioned between the separator blade and the top disc;
wherein the cut-out of the separator blade is above a portion of the top disc that is not cut out, the cut-out of the top disc is below a portion of the separator blade that is not cut out, and the cam of the wiper blade is above the cut-out of the top disc.

9. An apparatus for dispensing non-round, flexible, elastic, flanged containers having corners and non-vertical sides, from the bottom of a nested stack of said containers, said apparatus comprising a base and a plurality of the rotor assemblies of claim 8, wherein each rotor assembly is positioned on the base to operate on a corner of the containers.

10. A process for dispensing non-round, flexible, elastic, flanged containers having corners and non-vertical sides, from the bottom of a nested stack of such containers, said process comprising:
(a) providing an apparatus having a base and a plurality of rotor assemblies, each rotor assembly being rotatably mounted on the base and comprising:
   (i) a shaft journaled to the base for rotation;
   (ii) a separator blade;
   (iii) a wiper blade;
   (iv) a top disc; and
   (v) a squeezer wheel;
wherein the separator blade, wiper blade, and top disc are fixedly mounted with respect to each other on the shaft, and the squeezer wheel is eccentrically and rotatably mounted with respect to the separator blade, wiper blade, and top disc, on the shaft;
(b) supporting the stack of containers on the top discs;
(c) rotating the rotor assemblies to bring the squeezer wheels into contact with the corners of the bottommost container to compress the corners of the bottommost container so that the containers nested in the bottommost container rise, thereby creating a gap between the flanges of the bottommost and penultimate containers;
(d) rotating the rotor assemblies to insert the separator blades into the gap created by step (c) and to decompress the corners of the bottommost container; and
(e) rotating the rotor assemblies to dispense the bottommost container and drop the formerly penultimate container onto the top discs, whereby steps (b) to (e) can be repeated.

* * * * *

UNITED STATES PATENT AND TRADEMARK OFFICE
CERTIFICATE OF CORRECTION

PATENT NO. : 4,288,003
DATED : September 8, 1981
INVENTOR(S) : Carl Fries, Jr.

It is certified that error appears in the above—identified patent and that said Letters Patent is hereby corrected as shown below:

In claim 8, line 1, delete "claim 5" and substitute --claim 7-- therefor.

Signed and Sealed this

Twenty-third Day of February 1982

[SEAL]

Attest:

Attesting Officer

GERALD J. MOSSINGHOFF

Commissioner of Patents and Trademarks